United States Patent Office
3,238,219
Patented Mar. 1, 1966

3,238,219
PROCESS FOR PREPARING SYDNONES
Gerhard Wolfrüm and Günther Unterstenhöfer, Opladen, and Rolf Pütter, Dusseldorf, Germany, assignors to Farbenfabriken Bayer Aktiengesellschaft, Leverkusen, Germany, a corporation of Germany
No Drawing. Filed Sept. 25, 1957, Ser. No. 686,044
Claims priority, application Germany, Oct. 5, 1956, F 21,379; Mar. 20, 1957, F 22,631
4 Claims. (Cl. 260—307)

The present invention relates to new and useful insecticidal, especially acaricidal compositions, which contain as active ingredients compounds of the following formula

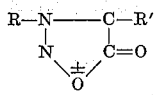

in which R stands for alkyl, aryl, aralkyl or heterocyclic radicals, and R' stands for halogen, hydrogen, alkyl or aryl, aralkyl or heterocyclic radicals.

The present invention also relates to a process of combating pests, especially mites with the above said compounds.

Many acaricides are known in the plant protecting field. They belong chemically to different classes of compounds such as chlorinated hydrocarbons of the DDT-type, to the class of p-chlorophenyl-p-chlorobenzene sulfonates, to azobenzenes and to other groups of chemical compounds. Lately many thiophosphoric acid esters also have been proven, being very effective against mites, too. Most of the compounds, however, after a certain period of application no longer affected the mites, thus, leading to resistant strains, which could no longer be combated with the same plant protecting agents.

Thus, it is a principal object of the present invention to find a new class of acaricides; another object is to find new acaricidal compositions which effectively kill such mites which have become resistant against the attack of common known insecticides; still another object is to find acaricidal compositions which are effective against mites, which have become resistant against the attack of phosphorus insecticides. Another object is the process of combating mites with these new acaricides.

Also an object of the present invention is a new and useful process for obtaining the above shown compounds. Still further objects will become apparent as the following description proceeds.

Now it has been found that sydnones of the following formula

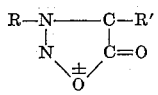

in which R and R' have the same significance as described above can effectively be used for combating mites. More particularly in these compounds R may be a lower alkyl radical such as methyl, ethyl, propyl, isopropyl, butyl and the like. Furthermore halogenated alkyl radicals such as the chloromethyl, dichloromethyl, chloroethyl, dichloropropyl radicals are well within the scope of the meaning of R. If R is aryl or more particularly phenyl this radical may also be substituted by groups such as lower alkyls, halogen, such as chlorine or bromine, by nitro groups, hydroxy groups, alkoxy or aryloxy groups, by alkylamino, dialkylamino or arylamino groups, by acyloxy or acylamino groups, by alkyl mercapto or aryl mercapto groups, by alkyl sulfonyl radicals and the like. Also substituents such as the COOH-group, its esters and salts, the cyano group, the rhodano group, the isocyanate group or isothiocyanate group are well within the scope of this invention. R may also be a heterocyclic radical, such as α-, β- or γ-pyridyl, pycolyl, quinolyl, and the like, as well as substitution products thereof.

R' can be of the same nature as described above for R, and it may be different or like R, but may also be additionally hydrogen or halogen such as chlorine or bromine.

It has to be understood, however, that all these compounds are given by way of illustration only and without limiting the present invention thereto.

These compounds are partially known from the literature and they are described for instance from Earl and Mackney in J. Chem. Soc. (London), 1935, 899 ff., or from Baker, Ollis and Poole in J. Chem. Soc. (London), 1950, 1942 ff. According to the methods described in the above said publications the sydnones are prepared by splitting off water from N-nitroso glycines. This splitting off of water is accomplished, e.g., with 4 to 5 times of acetic acid anhydride either at room-temperature or at slightly elevated temperatures up to about 100° C. After the reaction has been completed the acetic acid anhydride may be distilled off in vacuo or the reaction mixture may be poured into ice-water and the sydnone may subsequently be collected from the aqueous medium by known methods, e.g., filtration with suction.

Ring closure to sydnones may also be accomplished by known methods by reacting N-nitroso glycines such as N-nitrosophenyl glycine with trifluoro acetic acid anhydride or thionylchloride at lower temperatures and in inert unhydrous organic solvents. It is also possible to react salts of N-nitroso glycines such as the potassium salt with acetyl chloride in inert organic solvents such as benzene. If chlorinated or brominated sydnones are desired the compounds may be obtained by usual methods as, e.g., described by Eade and Earl in J. Chem. Soc. (London), 1946, 591 ff., and 1948, 2307 ff. If not known from the literature, sydnones of the inventive type may be prepared according to all these afore-mentioned processes using only equivalent amounts of reactants.

According to all these known methods of preparing sydnones N-nitroso glycines have to be prepared at first by nitrosation of glycines and subsequently isolation of the reaction products. Furthermore the nitroso glycines have to be dried to remove traces of water before they are reacted with acetic acid anhydride or other cyclizating reactants described above. Furthermore, if solvents are necessary for completion of the reaction these have to be of organic nature and also in strict anhydrous state.

Now, according to the present invention it has also been found that the acaricidal sydnones of the present invention may be prepared by an economical process starting from glycines, using water as a reaction medium and without isolating the N-nitroso compounds. Glycines are nitrosated and then without isolation of the reaction products reacted in water with organic or inorganic acid halides, especially the chlorides or with carbodiimides.

This reaction may be shown by the following reaction scheme:

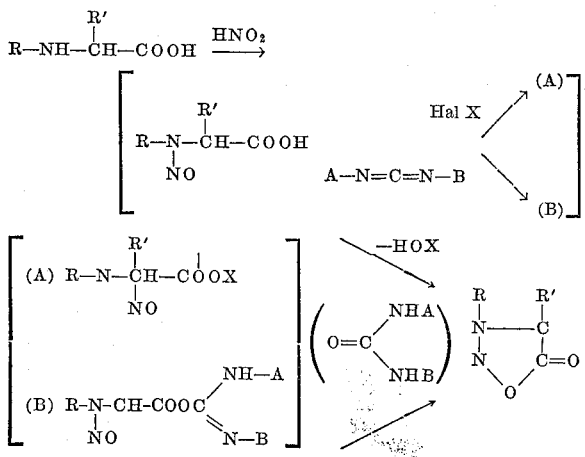

In the above shown formulae R and R' have the same significance as described in the foregoing description (except halogen), and X stands for an organic or inorganic acyl radical. In the radical of the carbodiimide of the above formula A and B stand for alkyl, aryl or aralkyl radicals, especially, however, for lower alkyl radicals. Suitable acid chlorides for the accomplishment of the above reaction are lower aliphatic carboxylic acid chlorides, lower aliphatic or benzene sulfonic acid chlorides such as especially benzene sulfochloride, carbonic ester chlorides such as carbonic acid ester chloride, phosgene, phosphorus oxy chloride, and the like.

The reaction according to this invention usually is carried out at lower temperatures say from about 0° C. to about 5° C. during the nitrozation process. The further reaction with acid chlorides or carbodiimides may be performed by room temperature or slightly elevated temperatures, say up to about 50° C. The reaction product if being a solid and crystallized material, may be isolated by filtering; if it is oily it may be taken up in suitable inert organic solvents and isolated in known manners.

The acaricidal sydnones of the present invention may be used together with suitable inert solid or liquid carriers or diluents and may be employed preferably either in the form of aqueous sprays or so called dust compositions. In these compositions a concentration of 0.05% to 1% of active ingredient is mostly sufficient to give full protection of plants against the attack of mites. Acaricidal mixtures, however, may well contain a remarkable higher content of active ingredient, if necessary. But mostly those concentrates may be diluted just before application.

When the above shown compounds are employed as powders or dusts they may be mixed with a substantial proportion of suitable inert materials or diluents, preferably in finely divided form, such as known grains of prepared parasiticide carriers, clays, pyrophyllite, fuller's earth, bentonite, sulfur, lime, talc, whiting, diatomaceous earth, and the like. Surface active ingredients which may be of anionic, nonionic or cationic nature may also be added so that a wettable powder may be obtained which may be applied directly to plants or which may be shaken up with water to a readily prepared suspension or a slurry of the active ingredient as well as of the powdered carrier for application to the plants in that form.

Liquid acaricidal sprays containing the above said sydnones may be prepared by dissolving these compounds first in suitable organic solvents especially in dimethyl formamide, lower aliphatic alcohols such as methanol or ethanol, acetone, benzene, toluene, xylene, and the like, then adding a certain amount say up to about 50% referred to active ingredient of wetting or emulsifying agents, which may be of anionic, nonionic or cationic nature, preferably fatty acids glycolates and polyglycolates, ethers of polyglycolates with alkylated phenols, such as the reaction product of ethylene oxide and isopropyl phenol or a benzylhydroxy diphenyl polyglycol ether. These mixtures of active ingredient, auxiliary solvents and wetting or dispersing agents are preferably incorporated in water in quantity sufficient to form an aqueous spray emulsion having the desired active ingredient concentration as defined above.

Sydnones of the present invention are generally of insecticidal action but specifically exhibit a remarkable acaricidal activity, especially against such forms of mites which have become resistant against the attack of common used phosphorus insecticides. A large scale of mites may be combated effectively with the compounds or compositions of the present invention. There may be named such pests as *Bryobia praetiosa* Koch also known as gooseberry red spider, *Eriophyes pyri* Pag also known as pear leaf blister mite, *Eriophyes ribis* Nal., also known as blackcurrant gall mite, *Metatetranychus ulmi* (*Paratetranychus pilosus* C. et F.) also known as common red spider, *Tarsonemus pallidus* Banks also known as cyclamen mite, *Eriophyes vitis* Pgst., *Tetranychus althaeae* V. Hansr. and the like. The compounds are not only effective against the mites but also against their egg as well as in the post-embryo stage. A special advantage of the sydnones still is the extremely good plant compatibility. In contrast to many other known miticides green plants are not damaged at all with sprays of the inventive sydnones.

*Example 1*

3-phenyl-sydnone is dissolved in the same amount of dimethyl formamide and this solution is emulsified in water after addition of 40% by weight based on the sydnone of benzyl hydroxy diphenyl glycol ether.

With *T. telarius* (red resistant and green resistant forms) infected black beans are sprayed with this emulsion. The results against resistant strains of common spider mites against phosphorus insecticides is to be seen from the tables below:

TABLE 1.—CONTACT INSECTICIDAL ACTION

| Concentration in percent | *T. telarius* (red resistant) | | | *T. telarius* (green resistant) | | |
|---|---|---|---|---|---|---|
| | Percent killed active stages after— | | Attack stage after 8 days | Percent killed active stages after— | | Attack stage after 8 days |
| | 24 hours | 48 hours | | 24 hours | 48 hours | |
| 0.2 | 0 | 20 | 0 | 70 | 100 | 0 |
| 0.1 | 0 | 0 | 0 | 40 | 100 | 0 |
| 0.05 | 0 | 0 | 0–1 | 0 | 40 | 1–2 |

TABLE 2.—OVICIDAL ACTION

| Concentration in percent | *T. telarius* (red resistant) | | | *T. telarius* (green resistant) | | |
|---|---|---|---|---|---|---|
| | Percent emerged pests | | | Percent emerged pests | | |
| | 6 days | 8 days | 14 days | 6 days | 8 days | 14 days |
| 0.1 | 0 | 0 | 0 | 0 | 0 | 0 |
| 0.05 | 0 | 0 | 0 | 0 | 0 | 0 |

TABLE 3.—PERMANENT ACTIVITY ON EGGS

| Concentration in percent | *T. telarius* (red resistant) | | | *T. telarius* (green resistant) | | |
|---|---|---|---|---|---|---|
| | Percent larvae emerged from eggs after— | | | Percent larvae emerged from eggs after— | | |
| | 2–3 days | 4–5 days | 6–7 days | 2–3 days | 4–5 days | 6–7 days |
| 0.1 | 0 | 10 | 15 | 0 | 15 | 30 |

In Table 3 the tests have been carried out as follows: 2-3, 4-5, and 6-7 days after the infected plants have been sprayed females were put on the plants to lay their eggs at the same day. The figures indicate the killing rate in percent of the eggs laid at the above mentioned times.

Example 2

A solution consisting of equal parts of 3-phenyl-4-chlorosydnone and acetone is emulsified in water with the same amount of the same emulsifier as described in Example 1. This emulsion is used for spraying and is checked on resistant *T. telarius*.

| Concentration in percent | T. telarius resistant | | |
|---|---|---|---|
| | Percent killed active stages after— | | Attack stage after 8 days |
| | 24 hours | 48 hours | |
| 0.1 | 40 | 100 | 0 |
| 0.05 | 50 | 100 | 0 |
| 0.01 | 50 | 90 | 0-1 |

Example 3

An aqueous emulsion consisting of 3-(3'-chlorophenyl)sydnone was prepared exactly as described in Example 1 and checked on resistant *T. telarius*:

| Concentration in percent | T. telarius resistant | | |
|---|---|---|---|
| | Percent killed active stages after— | | Attack stage after 8 days |
| | 48 hours | 3 days | |
| 0.1 | 85 | 100 | 0 |
| 0.05 | 50 | 70 | 0-1 |

Example 4

A solution of 3-(4-chlorophenyl)-sydnone emulsified in water according to the description in Example 1 was checked on resistant *T. telarius* (red). There are obtained the following results:

| Concentration in percent | T. telarius red resistant | |
|---|---|---|
| | Percent killed spider mites after 48 hours | Attack stage after 8 days |
| 0.2 | 50 | 0 |
| .1 | 30 | 0 |
| 0.05 | 15 | 0-1 |

Example 5

An aqueous emulsion consisting of 3-(2'-methoxyphenyl)sydnone was prepared exactly as described in Example 1 and checked on *T. telarius* (resistant). There are obtained the following results:

| Concentration in percent | Percent killed active stages after— | | Attack stages after 8 days |
|---|---|---|---|
| | 48 hours | 3 days | |
| 0.1 | 60 | 80 | 0 |
| 0.05 | 50 | 70 | 1 |

In each of the Examples 1-5 the figures under attack stage mean

0=no
1=very slight
2=slight
3=medium
4=heavy and
5=complete attack.

Example 6

200 grams of phenylglycine (1 mole) are dissolved in 600 ml. of water together with 150 ml. of conc. hydrochloric acid. After clearing this solution with carbon black there is added while stirring at 0-5° C. a solution of 69 grams of sodium nitrite in 150 ml. of water. This mixture is stirred for half an hour and neutralized with soda lye at 0-10° C. To this solution of the sodium salt of N-nitrosophenyl glycine there are added very slowly 200 grams of benzene sulfochloride at a temperature of 10-40° C. and by adding soda at the same time a pH-value of 5-7 is kept. When all of the benzene sulfochloride is added the mixture is stirred for another hour and then filtered off with suction. The mixture is washed with water thoroughly and then dried. There are obtained 130 grams of a raw 3-phenylsydnone which melts at a temperature of 130-133° C. and after crystallisation from water or benzene at 135-136° C.

Example 7

165 grams of N-benzylglycine are treated with sodium nitrite as described in Example 6 and the obtained reaction mixture is neutralized with soda lye at a temperature of 0-10° C. To this solution consisting of the sodium salt of N-nitrosobenzyl glycine there are added slowly at a temperature of 10-40° C. 200 grams of benzene sulfochloride and the pH-value is kept at 5-7 while adding soda at the same time. Then the mixture is worked up as described in Example 6 and there are obtained 143 grams of 3-benzyl sydnone (M.P. 58-62° C.). After recrystallization from benzene/petroleum ether (4:1) the melting point of the colorless compound is 65-66° C.

Example 8

45 grams (¼ mole) of N-nitrosophenyl glycine are dissolved in 150 ml. of water. There are added at a temperature of 10-40° C. 31.5 grams (¼ mole) of diisopropyl carbodiimide. The mixture is stirred for 1 hour, filtered off with suction and washed with water thoroughly. The precipitate consists of an equimolecular mixture of diisopropyl urea and 3-phenyl sydnone. By repeated recrystallization from water there are obtained 33 grams of 3-phenylsydnone (M.P. 133-136° C.).

Example 9

113 grams of N-nitroso-N-(p-nitrophenyl)-glycine are dissolved in 300 ml. of water and there are added to this solution 63 grams of diisopropylcarbodiimide at a temperature of about 10-40° C. Then the mixture is worked up as described in Example 8. The reaction product (in form of yellow crystals) is recrystallized from butyl acetate and consists of 83 grams of 3-(4'-nitrophenyl)-sydnone (M.P. 183-186° C.).

Example 10

200 grams of phenylglycine (75% compound) are treated with nitrous acid as described in Example 6 and the reaction mixture is neutralized with soda lye at a temperature of 0-10° C. To this neutral solution of the sodium salt of N-nitrosophenyl glycine there is added slowly while stirring and at a temperature of about 10-40° C. phosgene while the pH-value is kept at 5-7 by addition of soda at the same time. It is very important to add the phosgene slowly so that it reacts completely and without being hydrolyzed. After addition of about more than 20-50% of the calc. amount of phosgene the addition usually is completed and the mixture is stirred for one further hour. There are obtained 132 grams of 3-phenylsydnone (M.P. 135–136° C.).

*Example 11*

83 grams of N-(2-methylphenyl)-glycine are suspended in 400 ml. of water and there is added a solution of 35 grams of sodium nitrite in 100 ml. of water while stirring and at 0–5° C. This mixture is stirred for further 2 hours at a temperature of 0–5° C. and then there are added slowly at the same temperature 60 ml. of conc. hydrochloric acid. The nitroso compound separates oily. The mixture is stirred for half an hour at a temperature of 0–5° C. and neutralized with soda lye at a temperature of 10° C. To this solution there is slowly added while stirring and at a temperature of about 10–40° C. phosgene while the pH-value is kept at 5–7 by adding soda at the same time. There have to be added about 20–50% of phosgene above the calc. amount. Then the mixture is worked up as described in Example 10 and there are obtained 66 grams of 3-(2'-methylphenyl)-sydnone (M.P. 94–95° C.). After recrystallization the melting point is 97–98° C.

*Example 12*

110 grams of 3.4-dichlorophenyl glycine are treated with sodium nitrite as described in Example 11. To the neutralized reaction mixture there is added phosgene as described in Examples 10 and 11. It is worked at a pH-value of about 5–7, at a temperature of about 10–40° C. and with 20–50% more phosgene than calculated. There are obtained 49 grams of a raw product (M.P. 130–135° C.). After recrystallization from alcohol the 3-(3',4'-dichlorophenyl)-sydnone melts at 145–147° C.

*Example 13*

70 grams of 4'-chloro-4-phenoxyphenyl glycine are treated with sodium nitrite acid as described in Example 11, but using here 17.3 grams of sodium nitrite in 50 ml. of water. The working up procedure is the same as described in Example 11. There are obtained 70 grams of a raw product (M.P. 125–130° C.). After recrystallization from 80% methanol the 3-[4'-(4''-chloro)-phenoxyphenyl]-sydnone melts at 135–137° C.

*Example 14*

84 grams of N-(n-butyl)-glycine hydrochloride are dissolved in 200 ml. of water and to this solution there is added at a temperature of −5° C. during half an hour a solution of 35 grams of sodium nitrite in 100 ml. of water. The mixture is stirred for 2 hours at a temperature of about −5° C. and at the same temperature this solution is neutralized with soda lye. To the sodium salt of N-nitroso-N-(n-butyl)-glycine there is added slowly while stirring phosgene. The temperature rises to 10–40° C. The pH-value is kept at 5–7 while adding soda. When 20–50% above the calculated amount of phosgene are added, the addition of phosgene is stopped and the mixture stirred for half an hour. The oily 3-(n-butyl)-sydnone is extracted twice with 200 ml. ether of benzene. The extracts are dried over sodium sulfate, the solvent is distilled off and the residue is fractionated in vacuo. There are obtained 43 grams of 3-(n-butyl)-sydnone (B.P. 162–164° C. 0.8 mm.).

*Example 15*

48 grams of N-cyclohexyl glycine hydrochloride are treated with sodium nitrite as described in Example 14, but using 17.3 grams of sodium nitrite in 50 ml. of water. To this neutralized solution there are added 20–50% more than calculated of phosgene at a temperature of 10–40° C. and a pH-value of 5–7 is kept while adding soda. This mixture is stirred for half an hour, then filtered off with suction and washed with water. After drying there are obtained 38 grams of a raw product melting at a temperature of 60–62° C. After recrystallization from benzene/petroleum ether (1:1) the 3-cyclohexyl sydnone melts at 66–67° C.

*Example 16*

Using 57 grams of α-anilino-phenyl-acetic acid and working exactly as described in Example 11 there are obtained 41 grams of 3.4-diphenyl sydnone, which melts at a temperature of about 186–188° C. (after recrystallization from benzene).

We claim:
1. A process for the production of sydnones of the formula

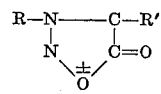

in which R and R' stand for a member selected from the group consisting of hydrogen, alkyl, aryl, aralkyl and heterocyclic radicals, which comprises reacting a N-nitroso glycine of the formula

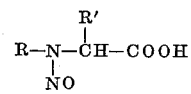

wherein R and R' have the same significance as described above, in an aqueous reaction medium with a member selected from the group consisting of carbonic acid chlorides, sulfonic acid chlorides, carboxylic acid ester chlorides, phosgene, phosphorus oxychloride and lower alkyl carbodiimides.

2. A process for the production of sydnones according to claim 1 wherein the N-nitroso-glycines are reacted with phosgene.

3. A process according to claim 1 wherein R is a phenyl radical and R' is hydrogen.

4. A process according to claim 1 wherein R and R' are both phenyl radicals.

References Cited by the Examiner

UNITED STATES PATENTS

| | | | |
|---|---|---|---|
| 2,648,669 | 8/1953 | Roemer et al. | 260—307 |
| 2,714,082 | 7/1955 | Davies et al. | 167—33 |
| 2,724,678 | 11/1955 | Gatzi et al. | 167—33 |
| 2,752,357 | 6/1956 | Watanabe | 260—307 |

OTHER REFERENCES

Chem. Abs., 46, 2871 (1952).
Hill et al., J. Chem. Soc., vol. 1953, pages 1482–90.
J. Chem. Soc. (London), 1935, 899–901; 1949, 307–314; 1950, 1542–1551; 1953, 1482–1490.

IRVING MARCUS, *Primary Examiner.*

H. J. LIDOFF, MORRIS O. WOLK, WILLIAM B. KNIGHT, JULIAN S. LEVITT, *Examiners.*